US012157542B2

(12) United States Patent
Mogrovics (10) Patent No.: US 12,157,542 B2
(45) Date of Patent: Dec. 3, 2024

(54) KAYAK WITH ADDITIONAL DRIVE

(71) Applicant: Lukas Mogrovics, Olomouc-Losov (CZ)

(72) Inventor: Lukas Mogrovics, Olomouc-Losov (CZ)

( * ) Notice: Subject to any disclaimer, the term of this patent is extended or adjusted under 35 U.S.C. 154(b) by 426 days.

(21) Appl. No.: 17/633,826

(22) PCT Filed: Sep. 23, 2020

(86) PCT No.: PCT/CZ2020/000042
§ 371 (c)(1),
(2) Date: Feb. 8, 2022

(87) PCT Pub. No.: WO2021/073664
PCT Pub. Date: Apr. 22, 2021

(65) Prior Publication Data
US 2022/0227464 A1    Jul. 21, 2022

(30) Foreign Application Priority Data
Oct. 15, 2019    (CZ) .................................. CZ2019-639

(51) Int. Cl.
*B63B 34/10*        (2020.01)
*B60L 50/64*        (2019.01)
(Continued)

(52) U.S. Cl.
CPC .............. *B63B 34/10* (2020.02); *B60L 50/64* (2019.02); *B63B 34/20* (2020.02); *B63H 21/17* (2013.01);
(Continued)

(58) Field of Classification Search
None
See application file for complete search history.

(56) References Cited

U.S. PATENT DOCUMENTS 5,481,997 A * 1/1996 Arndt ..................... B63H 11/02
D12/302
5,937,785 A * 8/1999 Murray, III ............ B63H 11/02
440/38

(Continued)

FOREIGN PATENT DOCUMENTS

CN    107284613 A * 10/2017 ............. B63B 34/26
ES    1189435 U * 8/2017
(Continued)

*Primary Examiner* — S. Joseph Morano
*Assistant Examiner* — Jovon E Hayes
(74) *Attorney, Agent, or Firm* — Bryant J. Keller; Kirton McConkie (57) ABSTRACT

A kayak with additional drive formed with a hull whose part is a bottom and a deck in which is formed a crew chamber equipped with a seat and which is equipped not only with an electric engine, which is coupled with a screw-propeller, but also with a battery, which is electrically conductive way connected with the electric engine, where the electric engine is placed on a supporting frame in the back end part of the kayak and is, by help of at least a drive element, which is by its end part waterproof way freely pivoted in the stern of the kayak in axial direction, coupled with the screw-propeller, whereas the battery is placed in a battery box which is placed in the front end part of the kayak.

17 Claims, 6 Drawing Sheets

(51) Int. Cl.
*B63B 34/20* (2020.01)
*B63H 21/17* (2006.01)
*B63H 23/06* (2006.01)
*B63H 23/34* (2006.01)

(52) U.S. Cl.
CPC ............ *B63H 23/06* (2013.01); *B63H 23/34* (2013.01); *B60L 2200/32* (2013.01)

(56) References Cited

U.S. PATENT DOCUMENTS

| | | | |
|---|---|---|---|
| 9,914,519 B2* | 3/2018 | Nutz | B63H 20/007 |
| 2002/0195039 A1* | 12/2002 | Anderson | B63H 5/14 |
| | | | 114/347 |
| 2007/0012236 A1* | 1/2007 | Caples | B63B 34/20 |
| | | | 114/347 |
| 2007/0249241 A1* | 10/2007 | Mott | B63H 21/24 |
| | | | 440/38 |
| 2009/0198395 A1* | 8/2009 | Winsky | B63H 21/17 |
| | | | 440/1 |
| 2011/0104963 A1* | 5/2011 | Ellis | G01C 21/203 |
| | | | 440/6 |
| 2014/0318435 A1* | 10/2014 | Murray, III | B63H 21/30 |
| | | | 114/77 R |
| 2014/0364020 A1 | 12/2014 | Stone et al. | |
| 2016/0229510 A1 | 8/2016 | Aguirre | |

FOREIGN PATENT DOCUMENTS

| | | |
|---|---|---|
| KR | 101880404 B1 | 8/2018 |
| WO | 2008/134762 A1 | 11/2008 |

* cited by examiner

KAYAK WITH ADDITIONAL DRIVE

PRIOR ART

This invention falls within the area of small vessels with an auxiliary engine and describes kayak with additional drive.

PRESENT PRIOR ART

Man powered small vessels are often completed with additional drive units by which is possible to use several different designs of their construction. In case of kayaks and canoes these are, for example various way designed suspended engines with propellers which are fixed to the side of vessels as it is described for example in the file US20140364020. This design requires, before each float, difficult assembly of drive unit equipment of the hull with next structural elements which are fixed to it. Also there are known designs when additional engine with propeller is placed under the bottom of vessel as is it described for example in the file WO2008134762. This type of design deepens draught of the vessel, which is solved with tilting of the body of drive unit into a cutout in the hull of the vessel, nevertheless, despite this is the use of this submersible engine limited only for places with sufficient depth. In the file US20070249241 is described a small vessel with kayak appearance but with a combustible engine which is only source of frontward movement thus it is not vessel which is primarily man powered. The combustion engine seems to be, for use in light vessels which are often carried in hands, completely unsuitable not only due to its weight but also its noisiness and likewise pollution of environment. Similar designs offer also the files U.S. Pat. Nos. 5,481,997 and 5,937,785, but there are the vessels powered by a turbine thus it is not kayak but a small motor boat. A kayak with engine which is also equipped with a paddle is described in the file US20020195039 but also in this case it is powered by a combustible four-stroke engine and whole drive system is quite complicated so even here are clear complications namely noisiness and weight and also there is difficult manipulation. Another possible design is fixation of an auxiliary electro-engine as a part of helm of the kayak as it is described for example in the file US2009198395. Yet here the performance of the engine is significantly limited by the helm design itself on which is the auxiliary engine fixed and where can come to emergency situation when comes to failure of the helm control with the engine in full performance mode. Control of engine performance seems to be also problematic and furthermore there is not a paddle at disposal which can lead in case of engine failure to occurrence of dangerous situation. In the file US20160229510 is described a kayak in whose inner space, which is accessible through a sealable waterproof lid, is placed a drive module which consists of an electric engine, a battery cage with batteries and a regulator. This module is placed on the bottom of the kayak, under seat of the pilot, approximately in the gravity center of the kayak or possibly battery cages are together with batteries placed along the sides of the seat. The electric engine is coupled by the help of a shaft with a pump in the rear part of the kayak which serves as a drive. The shaft can be connected to the electric engine either directly or through a chain gear. The alternative is to equip the kayak with screw-propeller. The battery cages can be equipped with a sliding device which enables their lengthwise movement for better front-back load of weight. Position of the drive module under the seat is disadvantageous from the point of view of the gravity center height after occupying of the seat with a kayaker hence the higher seat also means higher position of the torso of the kayaker, whose weight is for the height of the gravity center essential, whereas the higher gravity center means lower stability and higher risk of keel over. Placement of the batteries alongside of the seat then means wider width of the kayak which has negative impact on its sped and energy consumption. Likewise position of the electric engine in the gravity center of the vessel not only requires too long shaft, which negatively influences the weight and also energy consumption, but also with higher speed there comes to excessive lift of the bow and the kayak can become less stable and controllable. The kayaks are the most damage vulnerable just in the lace of the bottom under the kayaker which results from the structure itself thus even from this point of view placement of the drive unit in this area is not beneficial. General lay out therefore is not very suitable for use in common lake and sea kayaks where is important low weight and sufficient speed and controllability.

The aim of presented invention is to introduce a kayak with integrated auxiliary drive which would not excessively increase the draught of the vessel, would not increase weight and thus worsen controllability and which would have evenly distributed weight of the driving apparatus and at the same time this apparatus would be positioned in safe zones of the vessel.

The Essence of Technical Design

This goal is reached with an invention which is a kayak with additional drive which is formed by a hull whose part is a bottom in which is formed a crew chamber equipped with a seat and which is equipped not only with an electric engine, which is coupled with a propeller, but also with a battery which is electrically connected with the electric engine. The essence of the invention is that the electric engine is fixed on a supporting frame which is designed as a vertically flat element which is placed perpendicularly to the lengthwise axis of the kayak and which is fixed in the end part of the kayak, where the electric engine is on the supporting frame fixed by the help of a flat engine frame which is fixed on the supporting frame and it is with its plane parallel and also is by the help of a driving element, which is by its back end part waterproof way pivoted in the stern of the kayak in an axial direction, which is coupled with a screw-propeller, whereas the battery is placed in a battery box which is placed in front part of the kayak.

In smart design is the electric engine by the help of a transmission element coupled with a gear box which is fixed on the supporting frame whereas the entry shaft of the gear box is situated into the space between the supporting frame and the engine frame and is parallel with the engine shaft of the electric engine and on the output of the gear box is placed a drive element.

Likewise is advantageous when the drive element is connected directly to the engine shaft of the electric engine.

In another preferred design is the battery box designed waterproof.

Also is advantageous when the supporting frame is fixed in a waterproof chamber which is formed in the back end part of the kayak.

Also is advantageous when the battery box is placed in a waterproof bow chamber which is formed in the front end part of the kayak which is from the crew chamber separated with a waterproof front screen and which is accessible through a bow opening which is formed in the deck, whereas the bow opening is water proof way sealable with a bow cover.

Finally it is advantageous that in front of the engine chamber is in the hull of the kayak formed a storage chamber which is from the engine chamber separated with a waterproof back screen.

With this presented invention is reached new and higher efficiency as this design provides possibility of easier taking longer distances, makes easier counter flow sailing, whereas it does not significantly increase demand of deep water under the vessel and this all at keeping low weight of the vessel. Also another advantage is possibility to control the additional drive without necessity to unhand the paddle.

CLARIFICATION OF THE DRAWINGS

The particular examples of invention designs are schematically illustrated in enclosed drawings where.

The drawings which illustrate presented invention and subsequently described examples of particular design do not in any case anyhow limit the extent of the protection stated in the definition yet merely clarify the essence of the invention.

THE EXAMPLES OF INVENTION DESIGNS

Figure 1:
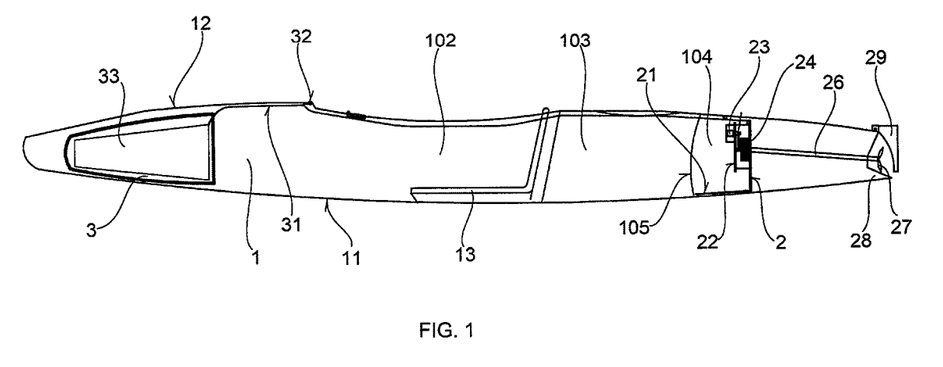
FIG. 1 is a schematic drawing of side view on lengthwise cut of the kayak.
Figure 2:
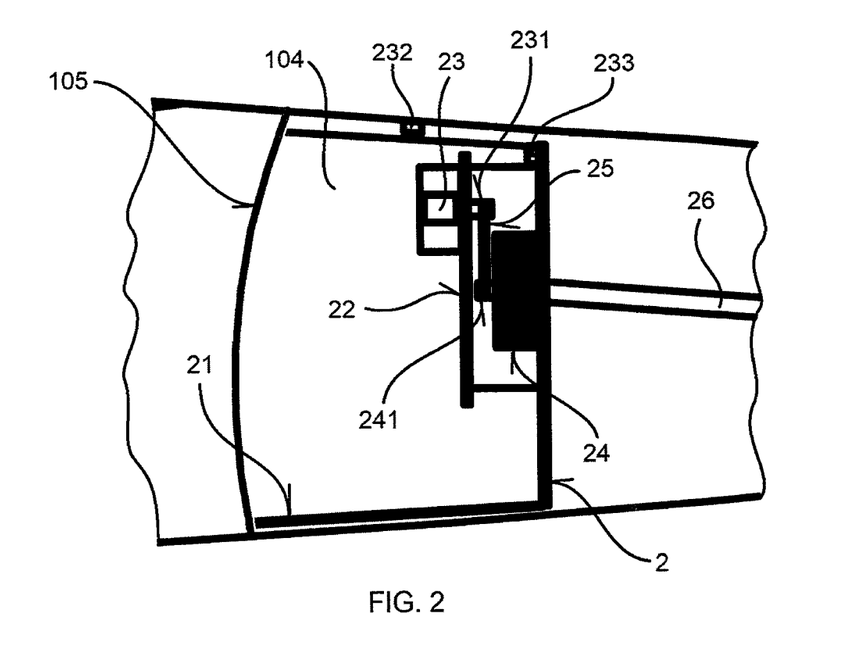
FIG. 2 is a schematic drawing of detailed side view of driving apparatus.
Figure 3:
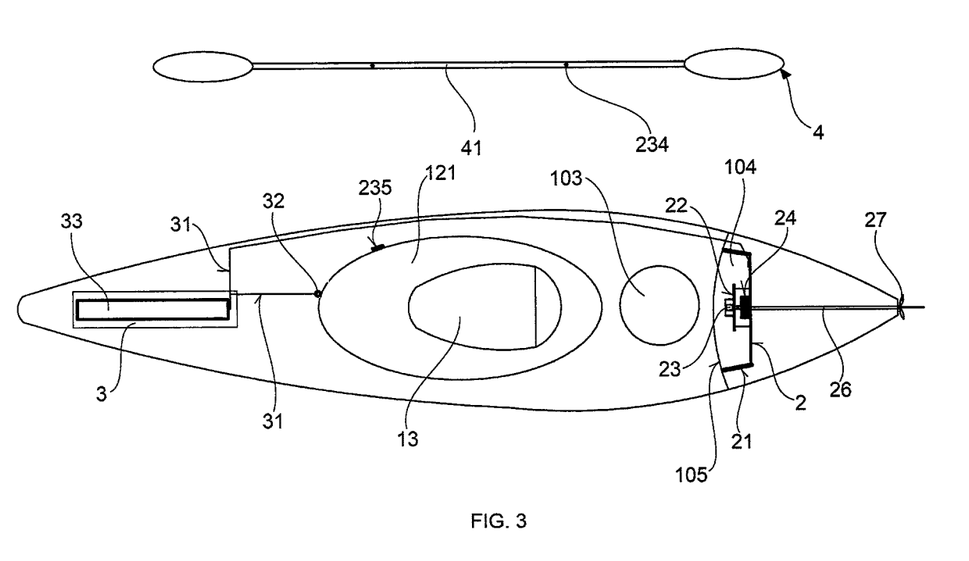
FIG. 3 is a schematic drawing of dorsal view on lengthwise cut of the kayak.
Figure 4:
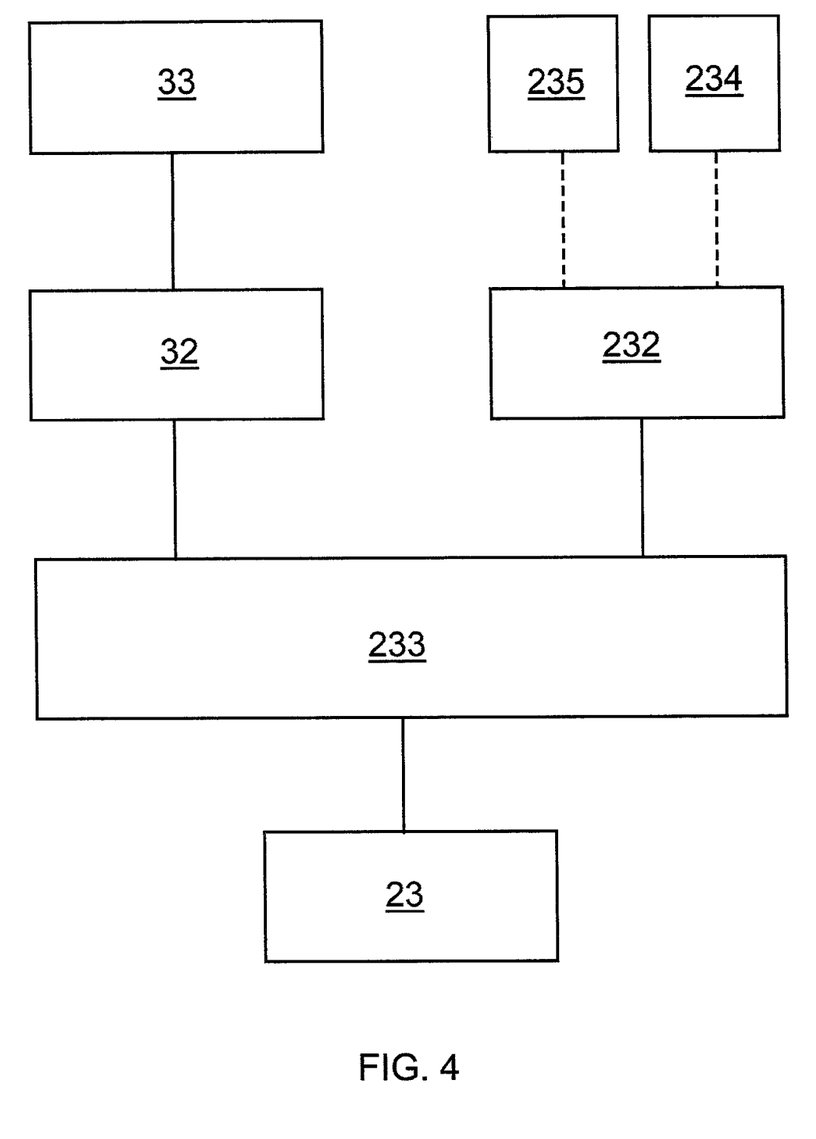
FIG. 4 is a scheme of connected electric elements.

The kayak with additional drive is according to illustration in FIGS. 1 to 3 formed by a hull 1 whose part is a bottom 11 and a deck 12. In the hull 1 are formed a crew chamber 102 which is accessible from above through a boarding opening 121 which is made in the deck 12 and it is equipped with a seat 13, a waterproof back storage chamber 103 and behind it, in the back end part of the hull 1 of the kayak, is placed an engine chamber 104. The back storage chamber 103 is from the engine chamber 104 separated with a waterproof back screen 105. In the engine chamber 104 is placed a supporting frame 2 which is designed as a vertical flat board which is situated perpendicularly to the lengthwise axis of the kayak. To the supporting frame 2 of the kayak are fixed two lengthwise placed cooling bodies 21 in the shape of thin strips or bars adjoining from inside along sides to the bottom 11 of the kayak which are made from a heat conductive material. On the supporting frame 2 is, by the help of a flat engine frame 22 which is fixed to the supporting frame 2 and it is parallel with its plane, placed an electric engine 23 which is by the help of a transmitting element 25, preferably a chain or a toothed belt, coupled with a gear box 24 which is fixed on the supporting frame 2. An input shaft 241 of the gear box 24 is then situated in the area between the supporting frame 2 and the engine frame 22, whereas the input shaft 241 is parallel with an engine shaft 231 of the electric engine 23. The electric engine 23 is connected with a regulator 233 which controls its performance. On an unmarked protrusion of the gear box 24 is placed a drive element 26, preferably designed as a shaft, which is directed toward the stern of the kayak, in whose wall is waterproof way pivoted and is consequently in an axial direction taken out from the hull 1. On the back end part of the drive element 26 is then fixed a screw-propeller 27. The back end part of the hull 1 of the kayak is, in its lower line, finished with a protective barb 28 which overreaches not only lengthwise but also vertical outline line of the screw-propeller 27. To the hull 1 of the kayak is, in its back end part, around the vertical axis pivoted a helm 29 whose working area is situated behind the screw-propeller 27. In the front end part of the hull 1 of the kayak is removable placed a battery box 3, preferably waterproof, with batteries 33 to which is, by the help of electric conductors 31 through a safety switch 32 connected the regulator 233 which is then connected with a wireless receiver 232. The safety switch 32 is placed on an unmarked welt of a boarding opening 121. On the side wall of the boarding opening 121 is placed a potentiometer 235 with an integrated non-illustrated wireless transmitter which is connected with the wireless receiver 232 through which is the potentiometer 235 connected to the regulator 233. On the shaft 41 of kayak paddle 4 which is an essential part of the kayak, is placed a controller 234, preferably a button type, with a non-illustrated integrated wireless transmitter through which is together with the wireless receiver 232 is the controller 234 connected with the regulator 233.

Figure 5:
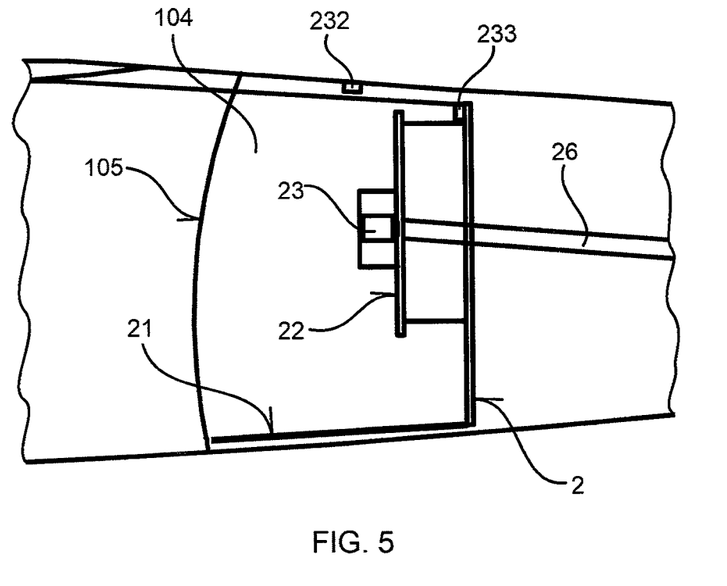
FIG. 5 is a schematic drawing of detailed side view of an alternative lay out of the driving apparatus and FIG. 6 is an alternative design of kayak bow with a bow chamber.

Connection of the electric engine 23 with the drive shaft 26 by the help of a transmitting element and the gear box 24 is not only possible design. Alternatively the electric engine 23 can be connected directly to the drive shaft 26 as is it illustrated in FIG. 0.5.

Figure 6:
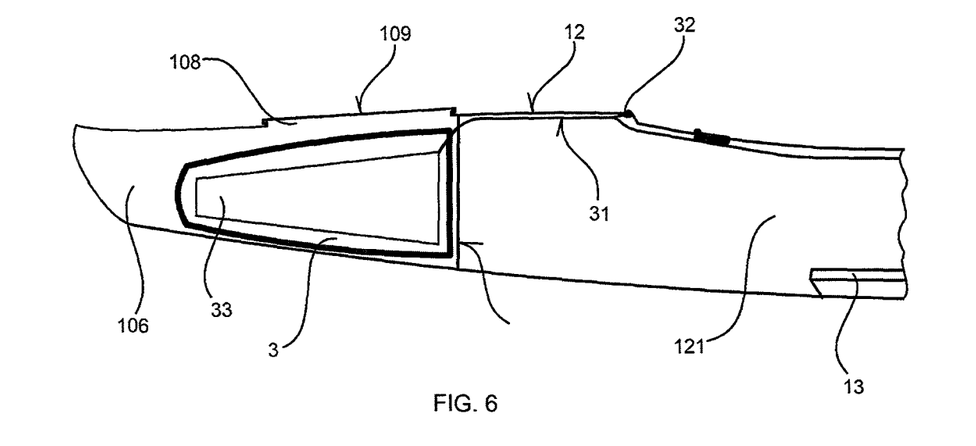

In alternative design which is illustrated in FIG. 6 is the battery box 3 placed in a waterproof bow chamber 106 which is formed in the front end part of the kayak and is from the crew chamber 102 separated by a waterproof front screen 107. The bow chamber 106 is accessible through a bow opening 108 which is formed in the deck 12 and it is waterproof way sealable with a bow cover 109.

INDUSTRIAL USABILITY

The invention is usable for structures of primarily man powered small vessels for example kayaks or canoes designed especially for leisure time purposes.

The invention claimed is:
1. A kayak with an additional drive, the kayak comprising:
a hull comprising a bottom, and
a deck comprising a crew chamber that is equipped with a seat and which is equipped not only with an electric engine, which is coupled with a screw-propeller, but also with a battery, which is electrically connected with the electric engine, wherein the electric engine is placed on a supporting frame, which is designed as a vertical flat element which is situated perpendicularly to a lengthwise axis of the kayak and is fixed in a back end part of the kayak, wherein the electric engine is on the supporting frame and is fixed by help of a flat engine frame which is fixed on the supporting frame and is parallel with a plane of the supporting frame and also is, by help of a drive element, which is by its end part waterproof, freely pivoted in a stern of the kayak in an axial direction, coupled with the screw-propeller, whereas the battery is placed in a battery box, which is placed in a front end part of the kayak.

2. The kayak with the additional drive according to claim 1, wherein the electric engine is, by help of a transmitting element, coupled with a gear box, which is fixed on the supporting frame, whereas an input shaft of the gear box is situated into an area between the supporting frame and the flat engine frame and is parallel with an engine shaft of the electric engine, and wherein on an output of the gear box is placed the drive element.

3. The kayak with the additional drive according to claim 1, wherein an engine shaft of the electric engine is connected to the drive element.

4. The kayak with the additional drive according to claim 1, wherein the battery box is made to be waterproof.

5. The kayak with the additional drive according to claim 1, wherein the supporting frame is fixed in a waterproof engine chamber, which is formed in the back end part of the kayak.

6. The kayak with the additional drive according to claim 1, wherein the battery box is placed in a waterproof bow chamber which is formed in the front end part of the kayak which is from the crew chamber separated by a waterproof front screen and which is accessible through a bow opening which is formed in the deck whereas the bow opening is sealable way closable with a bow cover.

7. The kayak with the additional drive according to claim 5, wherein in front of the waterproof engine chamber is in the hull of the kayak formed a storage chamber from which is the waterproof engine chamber separated by a waterproof back screen.

8. The kayak with the additional drive according to claim 2, wherein the battery box is configured to be waterproof.

9. The kayak with the additional drive according to claim 3, wherein the battery box is configured to be waterproof.

10. The kayak with the additional drive according to claim 2, wherein the supporting frame is fixed in a waterproof engine chamber which is formed in the back end part of the kayak.

11. The kayak with the additional drive according to claim 3, wherein the supporting frame is fixed in a waterproof engine chamber which is formed in the back end part of the kayak.

12. The kayak with the additional drive according to claim 4, wherein the supporting frame is fixed in a waterproof engine chamber which is formed in the back end part of the kayak.

13. The kayak with the additional drive according to claim 2, wherein the battery box is placed in a waterproof bow chamber which is formed in the front end part of the kayak which is from the crew chamber separated by a waterproof front screen and which is accessible through a bow opening which is formed in the deck whereas the bow opening is sealable way closable with a bow cover.

14. The kayak with the additional drive according to claim 3, wherein the battery box is placed in a waterproof bow chamber which is formed in the front end part of the kayak which is from the crew chamber separated by a waterproof front screen and which is accessible through a bow opening which is formed in the deck whereas the bow opening is sealable way closable with a bow cover.

15. The kayak with the additional drive according to claim 4, wherein the battery box is placed in a waterproof bow chamber which is formed in the front end part of the kayak which is from the crew chamber separated by a waterproof front screen and which is accessible through a bow opening which is formed in the deck whereas the bow opening is sealable way closable with a bow cover.

16. The kayak with the additional drive according to claim 5, wherein the battery box is placed in a waterproof bow chamber which is formed in the front end part of the kayak which is from the crew chamber separated by a waterproof front screen and which is accessible through a bow opening which is formed in the deck whereas the bow opening is sealable way closable with a bow cover.

17. The kayak with the additional drive according to claim 6, wherein in front of a waterproof engine chamber is in the hull of the kayak formed a storage chamber from which is the waterproof engine chamber separated by a waterproof back screen.

\* \* \* \* \*